Feb. 17, 1925.                                                                           1,526,402
                              E. F. WATSON
                   LOOP CIRCUITS FOR TELEGRAPH REPEATERS
                          Filed Feb. 27, 1924
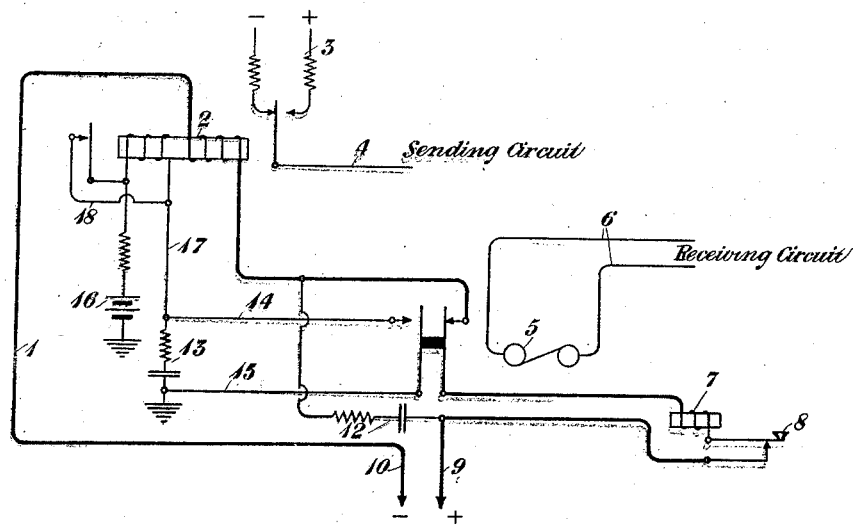
                                                                INVENTOR
                                                              E. F. Watson
                                          BY
                                                              ATTORNEY Patented Feb. 17, 1925.

1,526,402

UNITED STATES PATENT OFFICE.

EDWARD F. WATSON, OF LARCHMONT, NEW YORK, ASSIGNOR TO AMERICAN TELEPHONE AND TELEGRAPH COMPANY, A CORPORATION OF NEW YORK.

LOOP CIRCUITS FOR TELEGRAPH REPEATERS.

Application filed February 27, 1924. Serial No. 695,526.

*To all whom it may concern:*

Be it known that I, EDWARD F. WATSON, residing at Larchmont, in the county of Westchester and State of New York, have invented certain Improvements in Loop Circuits for Telegraph Repeaters, of which the following is a specification.

This invention relates to telegraph systems of the duplex type and more particularly to improvements in loop circuits for telegraph repeaters associated with such systems. Certain advantageous features of the invention consist in the fact that only two relays are required for each repeater set; it may be applied to a variety of types of telegraph systems; and as many repeaters as desired may by the arrangements of the invention be connected in series in one loop circuit. Other features and details of the arrangements of the invention will appear more fully from the detailed description hereinafter given.

The invention may be more fully understood from the following description together with the accompanying drawing in the figure of which is illustrated a circuit diagram of the invention.

In the drawing is shown the loop circuit 1 of the invention. The loop circuit is connected by conductors 9 and 10 to sources of positive and negative potential, not shown. The loop circuit includes a winding of a pole changer relay 2. This relay by its armature and contacts, controls the pole changer apparatus 3 whereby impulses of positive or negative polarity may be applied to the sending circuit 4. The loop circuit also includes the subscriber's telegraph set comprising the sounder 7 and the key 8. The loop circuit may be opened at the front contact of a receiving relay 5 controlled by a receiving circuit 6. A second winding is provided on the pole changer relay 2, included in a circuit comprising the battery 16, conductors 17 and 14, back contact of the receiving relay, and conductor 15. A condenser 13 is connected in parallel with this circuit and a condenser 12 is connected in parallel with the loop circuit as shown for purposes to be pointed out hereinafter. A back contact is also provided on the pole changer relay 2 to short circuit its left-hand winding for purposes to be pointed out hereinafter.

The invention may be more fully understood from a detailed description of its operation which is as follows: When receiving signals, the receiving relay 5, which may be of any suitable type, either polar or neutral, operates in accordance with the impulses coming in over the receiving circuit 6 thus opening and closing the loop circuit to repeat the open and closed signals to the subscriber's telegraph instruments such as sounder 7. The pole changer relay 2 is held operated during the operation of the receiving relay 5 either by the normal loop circuit current passing through its main or right-hand winding in the following manner: from negative battery over conductor 10, circuit 1, right-hand winding of relay 2, front contact of relay 5, sounder 7, key 8 and conductor 9 to positive battery, or by current passing through its secondary or left-hand winding over the following circuit when the relay 5 is released: from ground and battery 16, left-hand winding of relay 2, conductor 17, conductor 14, back contact of relay 5, conductor 15 to ground. During the interval when the armatures of the receiving relay 5 are "in the air" that is, not on either contact, the charging of either condenser 12 or 13 which are provided in parallel with each contact of the receiving relay 5, causes a current to continue to flow through one or the other windings of the pole changer relay 2 over either of the above traced circuits, and thus to hold it operated.

When signals are sent by the opening and closing of the key 8 at the subscriber's station in the loop circuit, the current through the main or right-hand winding of the pole changer relay 2 is interrupted and since the secondary or left-hand winding of this relay is open circuited at the back contact of the receiving relay 5 at this time, the pole changer relay 2 will operate repeating the signals sent from the subscriber's key 8. The contacts of the pole changer relay 2 cooperate with the pole changer apparatus 3 to send the desired signals to the transmitting branch 4 of the line circuit.

When the subscriber at the station shown, called the home subscriber, is sending and a break signal is received from the distant station, this signal will operate the receiving relay 5 which will open the loop circuit at its contacts. This will cause the subscriber's sounder 7 to be released, thus giving a break signal. Since this signal is received when the loop circuit is closed at the key 8, the pole changer relay 2 is held operated by current through its secondary or left-hand winding. When the distant operator closes his key the receiving relay 5 will be operated to close the loop circuit, thus restoring the entire arrangement to normal again. When the distant station is sending and the operator at the home station opens his key 8 to break, on the next marking impulse from the distant station the pole changer relay 2 will be released to send a spacing signal to the line. Further signals from the distant station which would operate relay 5, will now not operate the pole changer relay 2 as its main winding circuit is held open at the subscriber's key 8 while its secondary winding is short circuited over conductor 18, and its left-hand contact. Accordingly, the break signal will continue until the home subscriber again closes his key to restore the circuit to normal. It is pointed out that as many loop circuits of the above type as desired may be connected in series as the locking arrangements for each pole changer relay, such as 2, are individual to that particular relay and its associated receiving relay.

While the invention has been disclosed in certain specific arrangements which are deemed desirable, it is understood that it is capable of embodiment in many other various forms without departing from the spirit and scope of the invention as defined in the appended claims.

What is claimed is:

1. A telegraph system comprising a sending relay having an actuating winding and a holding winding, a receiving relay, front and back contacts and armatures for said receiving relay, a loop circuit including the actuating winding of said sending relay, said loop circuit being normally completed over the front contact and armature of said receiving relay when operated, and a circuit for the holding winding of said sending relay, said circuit being completed over the back contact and armature of said receiving relay when released.

2. A telegraph system comprising a sending relay having an actuating winding and a holding winding, a receiving relay, front and back contacts and armatures for said receiving relay, a loop circuit including the actuating winding of said sending relay, said loop circuit being normally completed over the front contact and armature of said receiving relay when operated, a condenser connected in said loop circuit in parallel with the armature and front contact of said receiving relay, a circuit for the holding winding of said sending relay, said circuit being completed over the back contact and armature of said receiving relay when released, and a condenser connected in said last mentioned circuit in parallel with said armature and back contact of said receiving relay.

3. A telegraph system comprising a sending relay having an actuating winding and a holding winding, a receiving relay, front and back contacts and armatures for said receiving relay, a loop circuit including the actuating winding of said sending relay, said loop circuit being normally completed over the front contact and armature of said receiving relay when operated, a circuit for the holding winding of said sending relay, said circuit being completed over the back contact and armature of said receiving relay when released, a key in said loop circuit for opening said loop circuit, whereby said sending relay may be released, and means associated with the circuit of said holding winding and controlled by said sending relay for rendering said holding winding ineffective.

In testimony whereof, I have signed my name to this specification this 21st day of February, 1924.

EDWARD F. WATSON.